(12) United States Patent
Vasquez (10) Patent No.: US 7,110,202 B1
(45) Date of Patent: Sep. 19, 2006

(54) DISK DRIVE EMPLOYING MULTIPLE INDEX MARKS

(75) Inventor: Steven R. Vasquez, Dana Point, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 180 days.

(21) Appl. No.: 10/698,787

(22) Filed: Oct. 31, 2003

(51) Int. Cl.
*G11B 5/09* (2006.01)

(52) U.S. Cl. ........................................ 360/51

(58) Field of Classification Search ............... 360/31, 360/48, 51, 53
See application file for complete search history.

(56) References Cited

U.S. PATENT DOCUMENTS

| | | | | |
|---|---|---|---|---|
| 5,274,509 A | * | 12/1993 | Buch | 360/48 |
| 5,544,135 A | | 8/1996 | Akin, Jr. et al. | |
| 5,627,695 A | * | 5/1997 | Prins et al. | 360/51 |
| 5,673,243 A | * | 9/1997 | Yanagi et al. | 360/48 |
| 5,768,044 A | | 6/1998 | Hetzler et al. | |
| 5,848,438 A | * | 12/1998 | Nemazie et al. | 360/53 |
| 6,000,018 A | | 12/1999 | Packer et al. | |
| 6,021,012 A | | 2/2000 | Bang | |
| 6,034,831 A | * | 3/2000 | Dobbek et al. | 360/53 |
| 6,034,835 A | * | 3/2000 | Serrano | 360/75 |
| 6,104,558 A | | 8/2000 | Greenberg et al. | |
| 6,404,582 B1 | | 6/2002 | Rodrigues de Miranda | |
| 6,504,664 B1 | | 1/2003 | Zook | |

\* cited by examiner

*Primary Examiner*—Wayne Young
*Assistant Examiner*—Glenda P. Rodriguez
(74) *Attorney, Agent, or Firm*—Howard H. Sheerin, Esq.; Jason T. Evans, Esq.

(57) ABSTRACT

A disk drive is disclosed comprising a disk surface having a plurality of concentric, radially spaced tracks, wherein each track comprises a plurality of data sectors and a plurality of servo sectors. At least two different index marks are distributed around the circumference of the disk surface. A servo sector counter is initialized relative to which index mark is detected, wherein the servo sector counter identifies a circumferential location of the servo sectors.

22 Claims, 6 Drawing Sheets

DISK DRIVE EMPLOYING MULTIPLE INDEX MARKS

BACKGROUND OF THE INVENTION

1. Field of the Invention

The present invention relates to disk drives. In particular, the present invention relates to a disk that employs multiple index marks.

2. Description of the Prior Art

Figure 1:
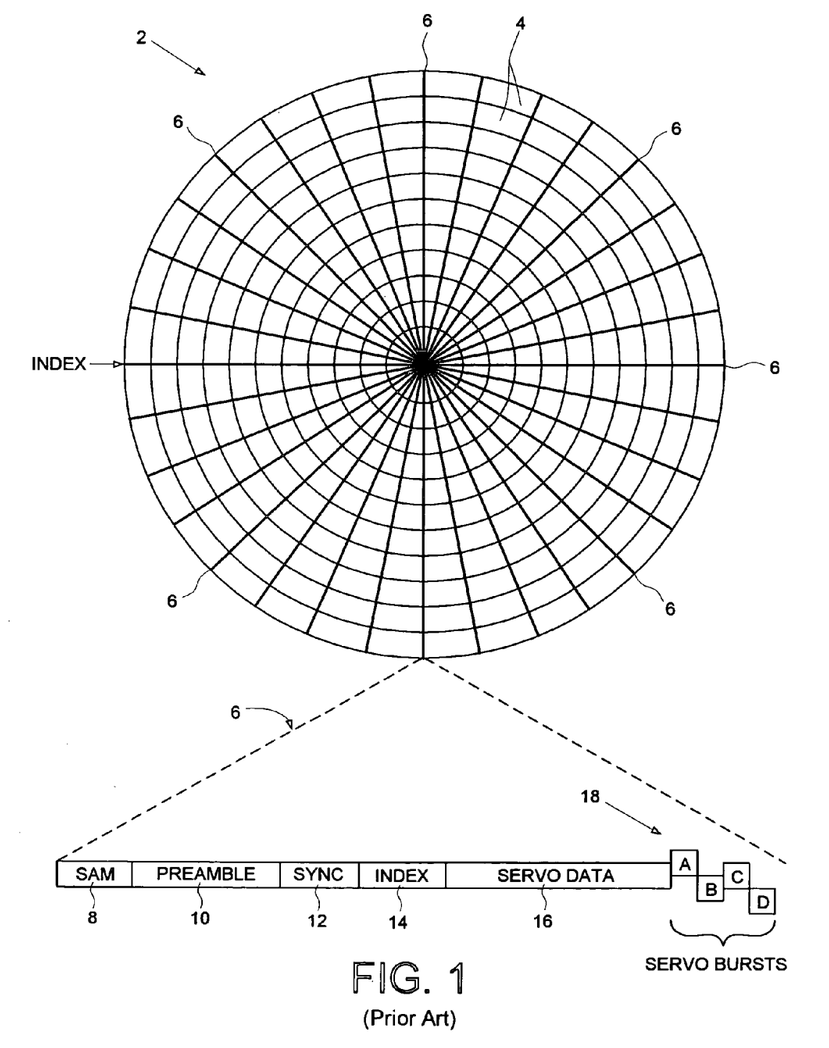
FIG. 1 shows a prior art disk format comprising a plurality of concentric, radially spaced tracks, wherein each track comprises a plurality of data sectors and a plurality of servo sectors, and the servo sectors are referenced circumferentially relative to a single index mark identified by an index servo sector.

As shown in FIG. 1, a conventional disk drive employs at least one disk 2 having a plurality of concentric, radially spaced tracks 4. Each track 4 comprises a number of data sectors interrupted by a number of embedded servo sectors 6 used to position a head over a target track and maintain the head over a centerline of the target track during read/write operations. Typically, both sides of the disk 2 are used to record information wherein a respective head is actuated radially over each disk surface. When the disk drive is powered on or a head switch occurs, the embedded servo sectors 6 are located and then used to servo the respective head over the disk 2.

Each servo sector 6 comprises a servo address mark (SAM) 8, a preamble 10, a sync mark 12, an index mark 14, servo data 16, and servo bursts 18. The SAM 8 comprises a predetermined sequence of bits (e.g., a plurality of "0" bits), which can be detected asynchronously during a power on or head switch event. Once the SAM 8 is detected in one of the servo sectors 6, the location of the remaining servo sectors 6 can be determined and suitable timing circuitry is configured to enable demodulation circuitry at the appropriate time (synchronous with the occurrence of each servo sector). The demodulation circuitry processes the preamble 10 to synchronize timing and gain control circuitry, and the sync mark 12 identifies the beginning of the servo data 16. The servo data 14 comprises information about the track, such as a track ID used during seek operations. Each servo burst 18 following the servo data comprises a "burst" of magnetic transitions, which are typically integrated to generate a servo burst signal. The servo burst signals are evaluated relative to one another to generate a position error signal (PES) used to maintain the head over a centerline of the track (tracking) during read/write operations.

Before performing a write operation to a particular track, it is important to accurately locate the target data sector to prevent inadvertently overwriting data in another data sector. To this end, prior art disk drives have employed a disk format wherein each data sector comprises a sector ID used to identify the sector. However, recording a sector ID in each data sector reduces the overall storage capacity due to format inefficiencies. More recent disk drives achieve improvement in format efficiency through an "ID-Less" disk format wherein the location of each data sector is derived from the servo sectors 6. One technique for identifying the data sectors in a track is to consider one of the servo sectors 6 as an INDEX servo sector as shown in FIG. 1. The INDEX servo sector records a valid index mark value (e.g., a "1" bit) in the index field 14, and the remaining servo sectors 6 record a non-index mark value (e.g., a "0" bit) in the index field 14. Once the INDEX servo sector is located, the remaining servo sectors 6 are referenced incrementally (e.g., using a servo sector counter). The data sectors are then identified using suitable timing circuitry after the occurrence of each servo sector 6. However, if the servo system loses synchronization after initially detecting the INDEX servo sector, the error condition is not detected until the INDEX servo sector is detected again. In addition, when the disk drive switches heads in order to access a different disk surface, it may require up to an entire revolution of latency to detect the INDEX servo sector. Still further, if a single bit is used to identify the INDEX servo sector, it may require several additional revolutions to ensure that the INDEX servo sector is not falsely detected due to noise.

U.S. Pat. No. 5,768,044 discloses a method for reducing the rotational latency after a head switch by adjusting the servo sector counter to account for the skew between the servo sectors on each disk surface. However, this technique also encodes a servo sector number into each servo sector to increase reliability in the event that the servo sector counter is adjusted by the wrong amount. Recording a servo sector number into each servo sector is undesirable because it reduces the format efficiency similar to recording a sector ID in each data sector.

There is, therefore, a need to increase servo synchronization robustness as well as reduce the rotational latency during a head switch in a disk drive employing ID-Less data sectors without reducing the format efficiency of the embedded servo sectors.

SUMMARY OF THE INVENTION

The present invention may be regarded as a disk drive comprising a disk surface having a plurality of concentric, radially spaced tracks, wherein each track comprises a plurality of data sectors and a plurality of servo sectors. The plurality of servo sectors comprise a first index servo sector, a second index servo sector, and at least one non-index servo sector between the first and second index servo sectors. A first index mark identifies the first index servo sector and a second index mark identifies the second index servo sector, wherein the first index mark is different than the second index mark. The disk drive further comprises a head actuated over the disk surface, and a disk controller for maintaining a servo sector counter that identifies the circumferential location of the servo sectors. The disk controller detects one of the first and second index marks and initializes the servo sector counter relative to which index mark is detected.

In one embodiment, the disk controller detects a loss of synchronization to the servo sectors by detecting one of the first and second index marks at the wrong time, and re-initializes the servo sector counter if loss of synchronization is detected.

In another embodiment, the disk drive comprises a first head actuated over a first disk surface and a second head actuated over a second disk surface. The disk controller performs a head switch operation to switch from the first head as the active head to the second head as the active head, and detects one of the first and second index marks recorded on the second disk surface after performing the head switch operation.

In yet another embodiment, each servo sector comprises an index mark field for storing a plurality of bits for recording one out of a group consisting of the first index mark, the second index mark, and a non-index mark.

In another embodiment, a first plurality of servo sectors comprise information for identifying the first index mark, and a second plurality of servo sectors comprise information for identifying the second index mark. In one embodiment, the first plurality of servo sectors does not include the first index servo sector, and the second plurality of the servo sectors does not include the second index servo sector. In yet another embodiment, each of the first plurality of servo sectors comprise at least one bit of the first index mark, and each of the second plurality of the servo sectors comprise at least one bit of the second index mark.

In yet another embodiment, each servo sector comprises a sync mark field for synchronizing to a servo data field, wherein the sync mark field stores one of a first and second sync mark, and the first sync mark is different than the second sync mark. The sync mark field in each of a first plurality of servo sectors identifies one bit of the first index mark, and the sync mark field in each of a second plurality of the servo sectors identifies one bit of the second index mark.

In another embodiment, the first and second index marks comprise a sequence of index bits that satisfy a run length limit (RLL) constraint, and a plurality of non-index servo sectors between the first and second index servo sectors comprise a sequence of non-index bits that violate the RLL constraint.

In still another embodiment, the first and second index marks are fault tolerant, and in another embodiment the first and second index marks comprise redundancy bits for distinguishing between the first and second index marks.

The present invention may also be regarded as a method of operating a disk drive, the disk drive comprising a disk surface having a plurality of concentric, radially spaced tracks. Each track comprises a plurality of data sectors and a plurality of servo sectors, wherein the plurality of servo sectors comprise a first index servo sector, a second index servo sector, and at least one non-index servo sector between the first and second index servo sectors. A first index mark identifies the first index servo sector and a second index mark identifies the second index servo sector, wherein the first index mark is different than the second index mark. A servo sector counter is maintained that identifies the circumferential location of the servo sectors. One of the first and second index marks is detected, and the servo sector counter is initialized relative to which index mark is detected.

DESCRIPTION OF THE PREFERRED EMBODIMENTS

Figure 2A:
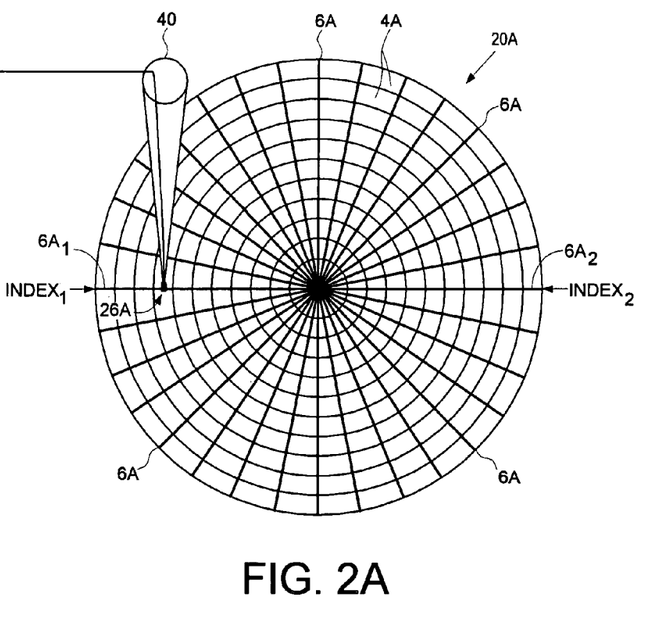
FIG. 2A shows a disk drive according to an embodiment of the present invention employing a disk format that includes at least a first index mark and a second index mark identified by index servo sectors.
Figure 2B:
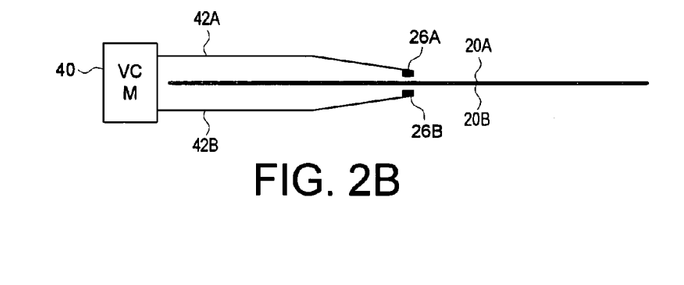
FIG. 2B shows an embodiment of the present invention wherein top and bottom heads are actuated by a voice coil motor over top and bottom disk surfaces.
Figure 2C:
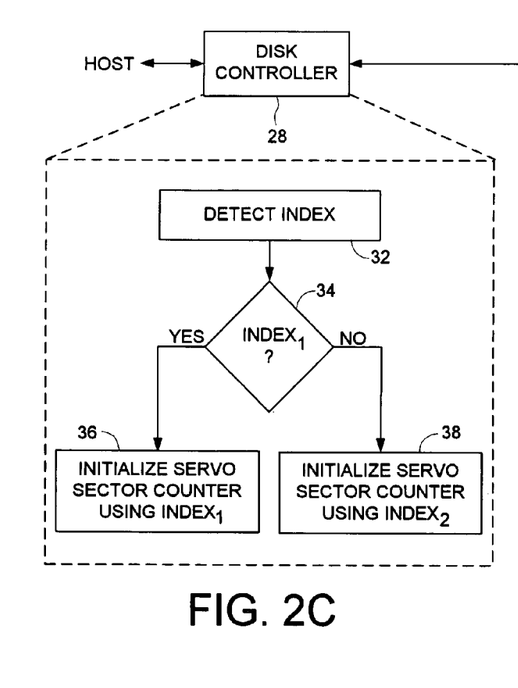
FIG. 2C is a flow diagram executed by a disk controller according to an embodiment of the present invention wherein a servo sector counter is initialized relative to which index mark is detected.

FIG. 2A shows a disk drive according to embodiment of the present invention comprising a disk surface 20A having a plurality of concentric, radially spaced tracks 4A. Each track 4A comprises a plurality of data sectors and a plurality of servo sectors 6A. The plurality of servo sectors 6A comprise a first index servo sector $6A_1$, a second index servo sector $6A_2$, and at least one non-index servo sector between the first and second index servo sectors $6A_1$ and $6A_2$. A first index mark $INDEX_1$ identifies the first index servo sector $6A_1$ and a second index mark $INDEX_2$ identifies the second index servo sector $6A_2$, wherein the first index mark $INDEX_1$ is different than the second index mark $INDEX_2$. The disk drive further comprises a head 26A actuated over the disk surface 20A, and a disk controller 28 for maintaining a servo sector counter that identifies the circumferential location of the servo sectors 6A. FIG. 2C shows a flow diagram executed by the disk controller 28. At step 32 one of the first and second index marks $INDEX_1$ and $INDEX_2$ is detected. If the first index mark $INDEX_1$ is detected at step 34, then at step 36 the servo sector counter is initialized relative the first index mark $INDEX_1$. If the second index mark $INDEX_2$ is detected at step 34, then at step 38 the servo sector counter is initialized relative the second index mark $INDEX_2$.

In one embodiment, the disk controller 28 detects a loss of synchronization to the servo sectors 6A by detecting one of the first and second index marks $INDEX_1$ or $INDEX_2$ at the wrong time, and re-initializes the servo sector counter if loss of synchronization is detected. On average a loss of synchronization will be detected within a quarter a revolution of the disk when two index marks are employed as compared to a half revolution of the disk when only one index mark is employed.

Figure 3A:
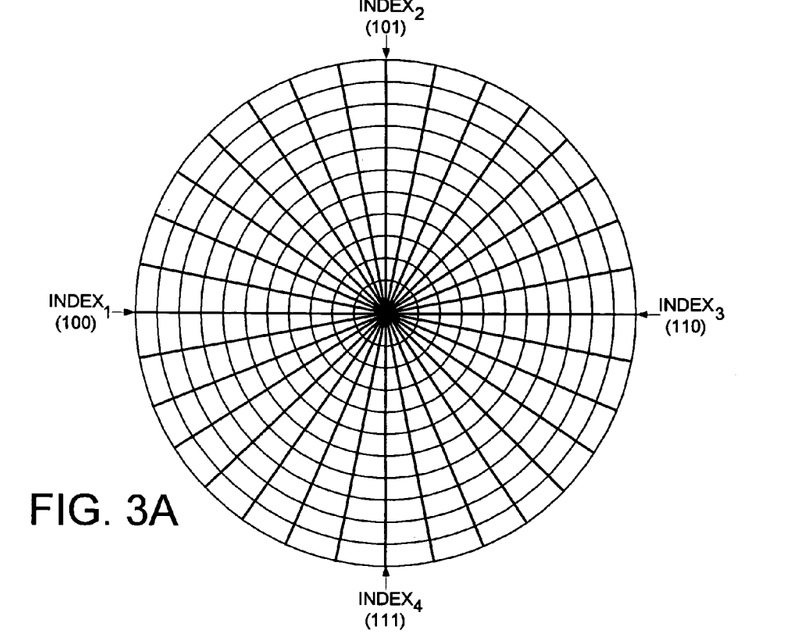
FIG. 3A shows a disk format according to an embodiment of the present invention including four different index marks distributed around the circumference of the disk.
Figure 3B:
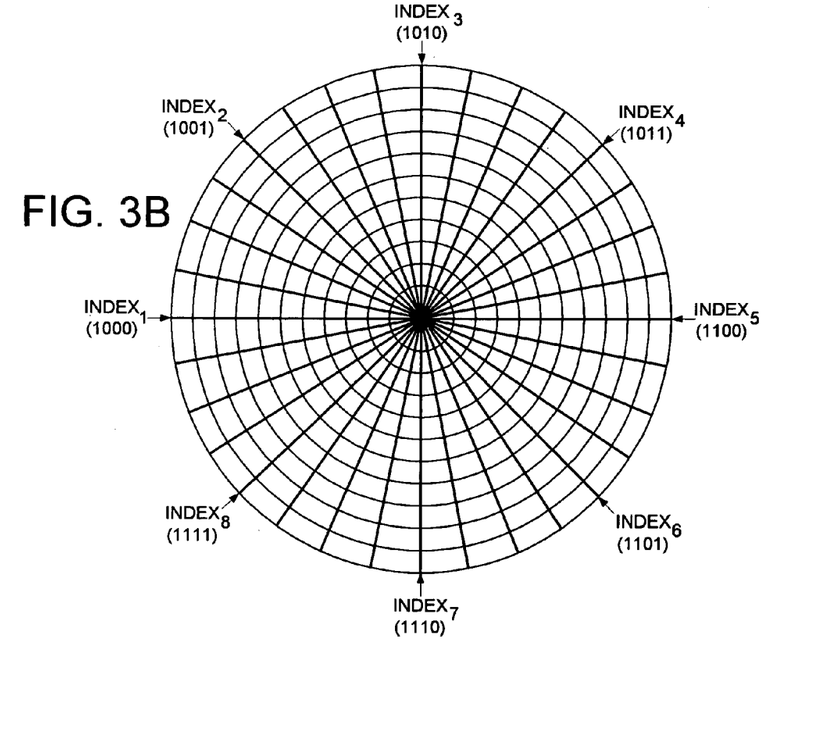
FIG. 3B shows a disk format according to an embodiment of the present invention including eight different index marks distributed around the circumference of the disk.

In one embodiment of the present invention, the disk drive comprises a single head actuated over a disk surface. In the embodiment of FIG. 2B, the disk drive comprises a first head 26A actuated over a first disk surface 20A, and a second head 26B actuated over a second disk surface 20B. The disk controller 28 performs a head switch operation to switch from the first head 26A as the active head to the second head 26B as the active head, and detects one of the first and second index marks recorded on the second disk surface 20B after performing the head switch operation. Employing multiple index marks reduces the rotational latency required to initialize the servo sector counter after a head switch operation. In the example of FIG. 2A, when two index marks are employed the rotational latency is reduced on average to one quarter of a revolution as compared to one half of a revolution when a single index mark is employed. FIG. 3A shows an embodiment of the present invention employing four index marks reducing the average rotational latency to ⅛ a revolution, and FIG. 3B shows an embodiment employing eight index marks reducing the average rotational latency to 1/16 a revolution. The number of index marks employed in the embodiments of the present invention is limited by the number of servo sectors 6A, as well as a run length limit (RLL) constraint described in detail below with reference to FIG. 5.

The disk drive in FIGS. 2A and 2B further comprises a voice coil motor (VCM) 40 which rotates top and bottom actuator arms 42A and 42B about a pivot in order to position the top and bottom heads 26A and 26B radially over the top and bottom disk surfaces 20A and 20B. In one embodiment, the disk controller 28 comprises a read channel for demodulating the read signal generated by the active head into a binary sequence representing the data recorded on the disk surface, as well as a servo controller for generating servo control signals applied to the VCM 40. The read channel and servo controller may be implemented as separate integrated circuits or they may be combined with other disk controller circuitry into a "system on a chip".

After performing a head switch operation, the location of the servo sectors recorded on the newly selected disk surface is not synchronized. Therefore the disk controller 28 searches asynchronously for the SAM 8 (FIG. 1) recorded in one of the servo sectors. Once a SAM 8 is detected, the servo sectors can be synchronized so that the disk controller 28 can determine when a next servo sector will pass under the head. However, the location of the data sectors recorded in the track is unknown until one of the index marks is detected. When one of the index marks is detected (INDEX$_1$ or INDEX$_2$), the disk controller 28 initializes a servo sector counter relative to which index mark is detected. For example, the disk controller 28 may initialize the servo sector counter to zero if the first index mark INDEX$_1$ is detected, and to a non-zero value if the second index mark INDEX$_2$ is detected. After initializing the servo sector counter, as each successive servo sector passes under the head the servo sector counter is incremented, and the location of each data sector within each servo wedge can be determined from the servo sector counter together with other suitable timing circuitry as is well known in the art.

In the embodiments of FIGS. 2A, 3A and 3B, each servo sector comprises an index mark field 14 (FIG. 1) for storing the bits of the index marks. Each index servo sector comprises a non-zero binary sequence identifying one of the index marks, and each non-index servo sector between the index servo sectors stores a zero binary sequence (no index mark). If two index marks are employed (FIG. 2A), the index mark field 14 comprises two bits for identifying a non-index mark value (00), a first index mark (10), and a second index mark (11). Similarly, three bits are used to identify four index marks (FIG. 3A), and four bits are used to identify eight index marks (FIG. 3B). In an embodiment disclosed below, the index mark field 14 may comprise additional bits to implement fault tolerant detection and/or redundancy bits to help distinguish between the different index marks.

Figure 4A:
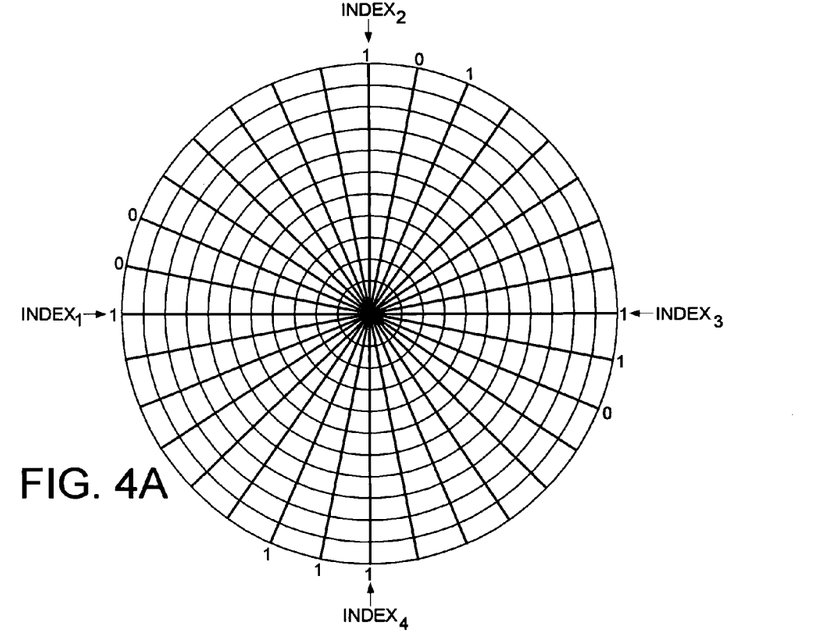
FIG. 4A shows a disk format according to an embodiment of the present invention wherein the bits of four different index marks are distributed over multiple servo sectors.
Figure 4B:
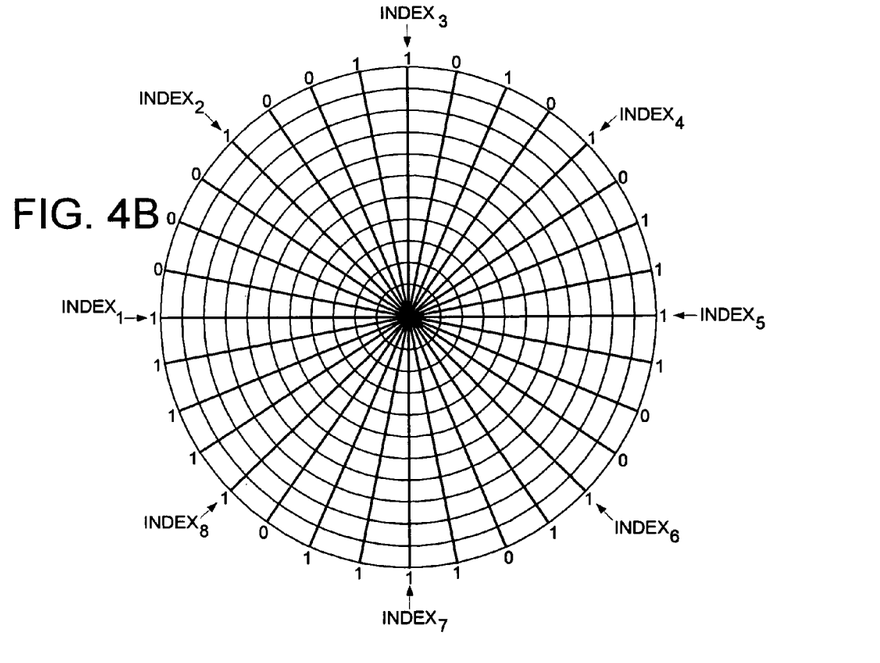
FIG. 4B shows a disk format according to an embodiment of the present invention wherein the bits of a eight different index mark are distributed over multiple servo sectors.

In an alternative embodiment, the number of bits in the index mark field 14 is reduced by distributing the bits of an index mark over a plurality of the servo sectors. FIG. 4A shows an embodiment wherein the index mark field 14 comprises a single bit for storing one bit of the index mark. In this example, three bits are used to identify four index marks, wherein three consecutive servo sectors store the three bits of an index mark. The non-index servo sectors store a zero in the index mark field 14. The disk in FIG. 4A rotates counter clockwise such that after detecting two consecutive "0" bits detecting a "1" bit in the index mark field 14 indicates the beginning of an index mark, and the next two servo sectors store the remaining two bits identifying the remainder of the index mark. FIG. 4B shows a similar embodiment wherein four bits are distributed over four consecutive servo sectors to identify eight index marks. This embodiment reduces the number of bits in the index mark field 14 from four to one, which is a significant improvement in format efficiency.

In the embodiment of FIG. 4A, the first servo sector in the group that identifies an index mark is considered the index servo sector, and the servo sector counter is initialized relative to this servo sector. However, any of the servo sectors may be considered as the index servo sector, and in one embodiment, a servo sector outside of the group identifying the index mark is considered as the index servo sector for initializing the servo sector counter.

In yet another embodiment, each servo sector comprises a sync mark field 12 (FIG. 1) for synchronizing to a servo data field 16, wherein the sync mark field 12 stores one of a first and second sync mark, and the first sync mark is different than the second sync mark. The sync mark field 12 in each of a first plurality of servo sectors identifies one bit of the first index mark, and the sync mark field 12 in each of a second plurality of the servo sectors identifies one bit of a second index mark. For example, the first sync mark may represent a "0" bit, and the second sync mark may represent a "1" bit in the index mark sequence. This embodiment further improves format efficiency by completely eliminating the index mark field 14.

Figure 5:
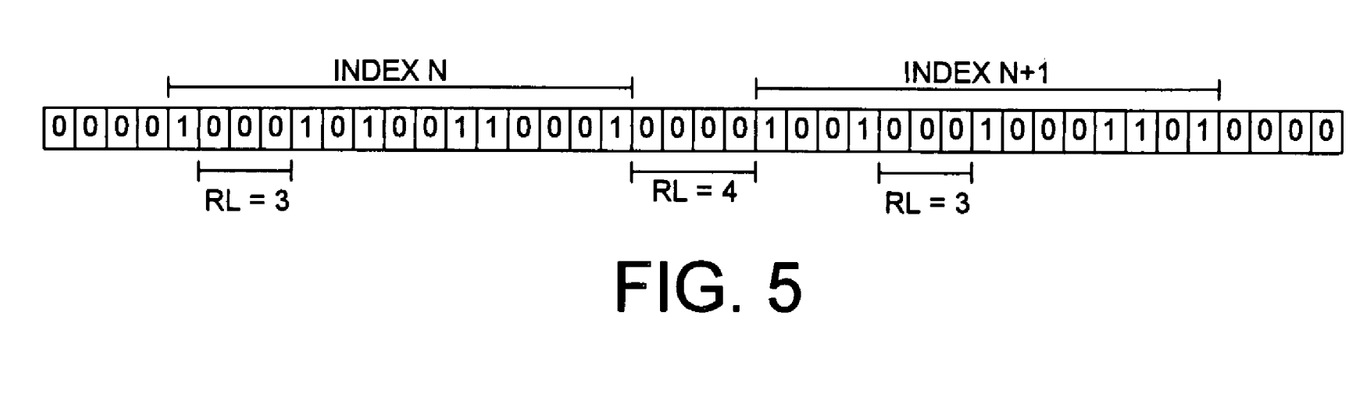
FIG. 5 illustrates an embodiment of the present invention wherein each bit of a plurality of index marks is recorded in a respective index servo sector, and the bits of each index mark are recorded according to a run length limit (RLL) constraint to help reduce ambiguity in detecting each index mark.

In the embodiment of FIG. 4B, the index marks occur one after another making it impossible to determine where each index marks begins. Therefore in one embodiment the index marks comprise a sequence of index bits recorded in consecutive index servo sectors that satisfy a run length limit (RLL) constraint, and a plurality of non-index servo sectors between the index servo sectors comprise a sequence of non-index bits that violate the RLL constraint. This embodiment is illustrated in FIG. 5 which shows the bits of a first index mark INDEX N and a second consecutive index mark INDEX N+1, wherein each servo sector stores one bit of the index mark. The sequence of index bits that identify an index mark satisfy an RLL constraint of three consecutive "0" bits (RLL=3). The non-index servo sectors between the index servo sectors store a sequence of "0" bits which violates the RLL constraint (i.e., comprises a sequence of "0" bits greater than three). The beginning of an index mark is detected by the first "1" bit that follows a sequence of "0" bits which violates the RLL constraint.

Figure 6:
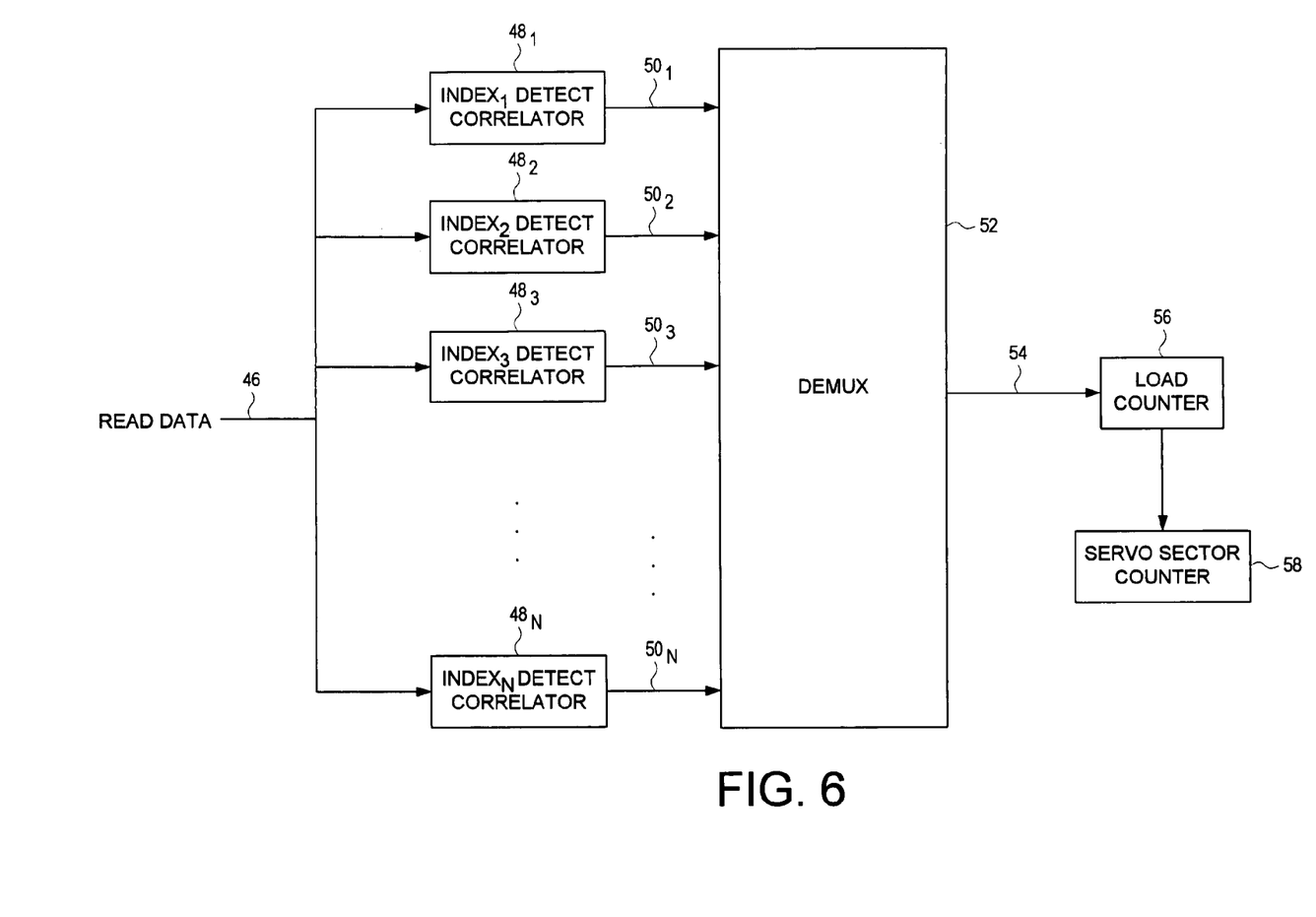
FIG. 6 shows circuitry including a plurality of index detect correlators and a demultiplexer for detecting one of a plurality of index marks and initializing the servo sector counter according to an embodiment of the present invention.

FIG. 6 shows circuitry according to an embodiment of the present invention for detecting the different index marks and for initializing the servo sector counter. The sequence of bits representing the read data 46 is input into a number of index detect correlators $48_1$–$48_N$. Each index detect correlator 48 comprises XOR circuitry for correlating the read data 46 with a sequence of bits corresponding to a respective index mark. The output of the XOR circuits is summed, and the summation compared to a threshold. If the summation exceeds the threshold, the index mark is considered detected and a respective output signal $50_1$–$50_N$ is activated. A demultiplexer 52 converts the activated output signal $50_1$–$50_N$ into a multi-bit control signal 54 applied to a load counter circuit 56. The load counter circuit 56 then loads the servo sector counter 58 with an appropriate value corresponding to the index mark detected.

In one embodiment, the sequence of bits for identifying the index marks is selected to have a predetermined fault tolerance. This enables a predetermined number of bits within an index mark to be misdetected (due to noise) while still detecting the index mark correctly. In this embodiment, the threshold in the index detect correlators $48_1$–$48_N$ is reduced to detect less than a perfect match.

In yet another embodiment, the sequence of bits for identifying the index marks includes redundancy bits for implementing an error correction code (ECC), such as a Hamming code or other suitable ECC code. This allows bits that are misdetected due to noise to be corrected, thereby helping to distinguish between the different index marks.

I claim:

1. A disk drive comprising:
   (a) a disk surface, wherein:
      the disk surface comprises a plurality of concentric, radially spaced tracks;
      each track comprises a plurality of data sectors and a plurality of servo sectors;
      the plurality of servo sectors comprise a first index servo sector, a second index servo sector, and at least one non-index servo sector between the first and second index servo sectors;
      a first index mark identifies the first index servo sector and a second index mark identifies the second index servo sector;
      the first index mark is different than the second index mark;
   (b) a head actuated over the disk surface; and
   (c) a disk controller for:
      maintaining a servo sector counter that identifies the circumferential location of the servo sectors;
      detecting one of the first and second index marks; and
      initializing the servo sector counter relative to which index mark is detected.

2. The disk drive as recited in claim 1, wherein:
   (a) the disk controller detects a loss of synchronization to the servo sectors by detecting one of the first and second index marks at the wrong time; and
   (b) re-initializes the servo sector counter if loss of synchronization is detected.

3. The disk drive as recited in claim 1, further comprising a first head actuated over a first disk surface and a second head actuated over a second disk surface, wherein the disk controller for:
   (a) performing a head switch operation to switch from the first head as the active head to the second head as the active head; and
   (b) detecting one of the first and second index marks recorded on the second disk surface after performing the head switch operation.

4. The disk drive as recited in claim 1, wherein each servo sector comprises an index mark field for storing a plurality of bits for recording one out of a group consisting of the first index mark, the second index mark, and a non-index mark.

5. The disk drive as recited in claim 1, wherein:
   (a) a first plurality of servo sectors comprise information for identifying the first index mark; and
   (b) a second plurality of servo sectors comprise information for identifying the second index mark.

6. The disk drive as recited in claim 5, wherein:
   (a) the first plurality of servo sectors does not include the first index servo sector; and
   (b) the second plurality of the servo sectors does not include the second index servo sector.

7. The disk drive as recited in claim 5, wherein:
   (a) each of the first plurality of servo sectors comprise at least one bit of the first index mark; and
   (b) each of the second plurality of the servo sectors comprise at least one bit of the second index mark.

8. The disk drive as recited in claim 7, wherein:
   (a) each servo sector comprises a sync mark field for synchronizing to a servo data field, wherein the sync mark field stores one of a first and second sync mark;
   (b) the first sync mark is different than the second sync mark;
   (c) the sync mark field in each of the first plurality of servo sectors identifies one bit of the first index mark; and
   (d) the sync mark field in each of the second plurality of the servo sectors identifies one bit of the second index mark.

9. The disk drive as recited in claim 7, wherein:
   (a) the first and second index marks comprise a sequence of index bits that satisfy a run length limit (RLL) constraint; and
   (b) a plurality of non-index servo sectors between the first and second index servo sectors comprise a sequence of non-index bits that violate the RLL constraint.

10. The disk drive as recited in claim 1, wherein the first and second index marks are fault tolerant.

11. The disk drive as recited in claim 1, wherein the first and second index marks comprise redundancy bits for distinguishing between the first and second index marks.

12. A method of operating disk drive, the disk drive comprises a disk surface having a plurality of concentric, radially spaced tracks, wherein each track comprises a plurality of data sectors and a plurality of servo sectors, the plurality of servo sectors comprise a first index servo sector, a second index servo sector, and at least one non-index servo sector between the first and second index servo sectors, a first index mark identifies the first index servo sector and a second index mark identifies the second index servo sector, and the first index mark is different than the second index mark, the method comprises the steps of:
   (a) maintaining a servo sector counter that identifies the circumferential location of the servo sectors;
   (b) detecting one of the first and second index marks; and
   (c) initializing the servo sector counter relative to which index mark is detected.

13. The method as recited in claim 12, further comprising the steps of:
   (a) detecting a loss of synchronization to the servo sectors by detecting one of the first and second index marks at the wrong time; and
   (b) re-initializing the servo sector counter if loss of synchronization is detected.

14. The method as recited in claim 12, wherein the disk drive further comprising a first head actuated over a first disk surface and a second head actuated over a second disk surface, further comprising the steps of:
   (a) performing a head switch operation to switch from the first head as the active head to the second head as the active head; and
   (b) detecting one of the first and second index marks recorded on the second disk surface after performing the head switch operation.

15. The method as recited in claim 12, wherein each servo sector comprises an index mark field for storing a plurality of bits for recording one out of a group consisting of the first index mark, the second index mark, and a non-index mark.

16. The method as recited in claim 12, wherein:
(a) a first plurality of servo sectors comprise information for identifying the first index mark; and
(b) a second plurality of servo sectors comprise information for identifying the second index mark.

17. The method as recited in claim 16, wherein:
(a) the first plurality of servo sectors does not include the first index servo sector; and
(b) the second plurality of the servo sectors does not include the second index servo sector.

18. The method as recited in claim 16, wherein:
(a) each of the first plurality of servo sectors comprise at least one bit of the first index mark; and
(b) each of the second plurality of the servo sectors comprise at least one bit of the second index mark.

19. The method as recited in claim 18, wherein:
(a) each servo sector comprises a sync mark field for synchronizing to a servo data field, wherein the sync mark field stores one of a first and second sync mark;
(b) the first sync mark is different than the second sync mark;
(c) the sync mark field in each of the first plurality of servo sectors identifies one bit of the first index mark; and
(d) the sync mark field in each of the second plurality of the servo sectors identifies one bit of the second index mark.

20. The method as recited in claim 18, wherein:
(a) the first and second index marks comprise a sequence of index bits that satisfy a run length limit (RLL) constraint; and
(b) a plurality of non-index servo sectors between the first and second index servo sectors comprise a sequence of non-index bits that violate the RLL constraint.

21. The method as recited in claim 12, wherein the first and second index marks are fault tolerant.

22. The method as recited in claim 12, wherein the first and second index marks comprise redundancy bits for distinguishing between the first and second index marks.

* * * * *